US008061700B2

(12) United States Patent
Zhang

(10) Patent No.: US 8,061,700 B2
(45) Date of Patent: Nov. 22, 2011

(54) CLAMP APPARATUS

(75) Inventor: Bing-Jun Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 423 days.

(21) Appl. No.: 12/430,056

(22) Filed: Apr. 24, 2009

(65) Prior Publication Data

US 2010/0230882 A1 Sep. 16, 2010

(30) Foreign Application Priority Data

Mar. 10, 2009 (CN) .......................... 2009 1 0300782

(51) Int. Cl.
*B23Q 3/06* (2006.01)

(52) U.S. Cl. ....................... 269/97; 269/91; 269/254 CS

(58) Field of Classification Search .................... 269/91, 269/95, 97, 100, 102, 134, 45, 54.5, 254 CS, 269/208; 409/219
See application file for complete search history.

(56) References Cited

U.S. PATENT DOCUMENTS

| | | | | |
|---|---|---|---|---|
| 2,987,313 | A * | 6/1961 | Bjering et al. | 269/14 |
| 3,222,053 | A * | 12/1965 | Severdia | 269/91 |
| 3,397,879 | A * | 8/1968 | Morawski et al. | 269/91 |
| 3,484,896 | A * | 12/1969 | Greenman | 452/195 |
| 3,572,216 | A * | 3/1971 | Seesody | 92/33 |
| 5,733,426 | A * | 3/1998 | Cox et al. | 204/298.01 |
| 6,659,440 | B2 * | 12/2003 | Levy | 269/45 |
| 2003/0141645 | A1 * | 7/2003 | Wang | 269/91 |
| 2005/0253319 | A1 * | 11/2005 | Zitzlaff | 269/91 |

* cited by examiner

*Primary Examiner* — David B Thomas
(74) *Attorney, Agent, or Firm* — Altis Law Group, Inc.

(57) ABSTRACT

A clamp apparatus to hold an object to a worktable includes a guiding pole mounted to the worktable, a pressing member connected to the guiding pole, a supporting pin extending from the pressing member towards the worktable, and a resilient member connected between the guiding pole and the worktable. the pressing member is rotatable related to the worktable between a first position and a second position. The pressing member forces the object against the worktable and the supporting pin passes through the worktable in response to restoring of the resilient member when the pressing member is moved to the first position. The supporting pin abuts against the worktable to keep a disengagement of the pressing member from the object overcoming restoring of the resilient member when the pressing member is moved to the second position.

13 Claims, 3 Drawing Sheets

CLAMP APPARATUS

BACKGROUND

1. Technical Field

The present disclosure relates to fixing apparatus and, more particularly, to a clamp apparatus for fixing an object to a worktable.

2. Description of the Related Art

Toggle clamps are used to hold objects in place for processing or testing, by clamping two objects together, or clamping an object to a worktable or another surface. An ordinary toggle clamp includes a clamping arm which pivots between a release position and a clamping position. However, substantial space is required to manipulate the clamping arm of the toggle arm.

DETAILED DESCRIPTION

Figure 1:
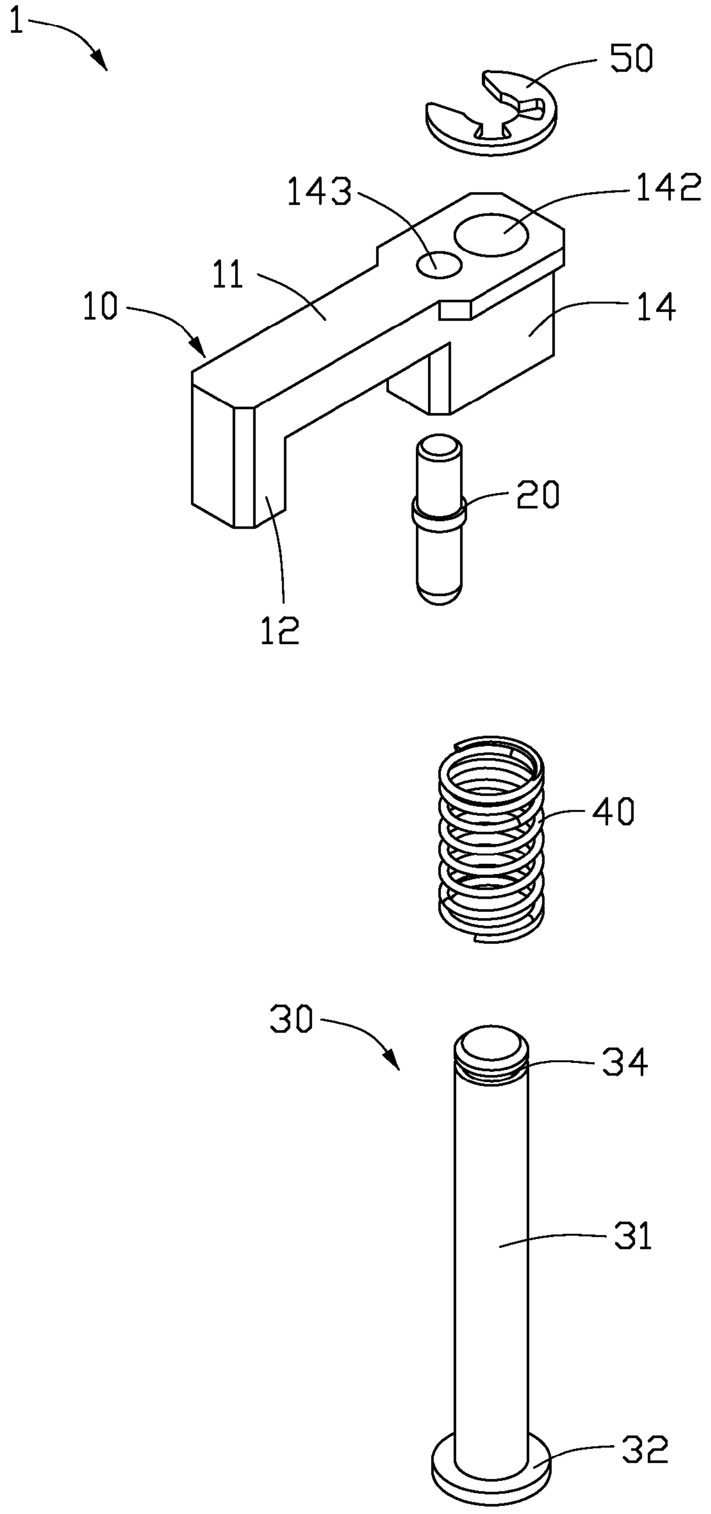
FIG. 1 is an exploded, isometric view of an embodiment of a clamp apparatus.
Figure 2:
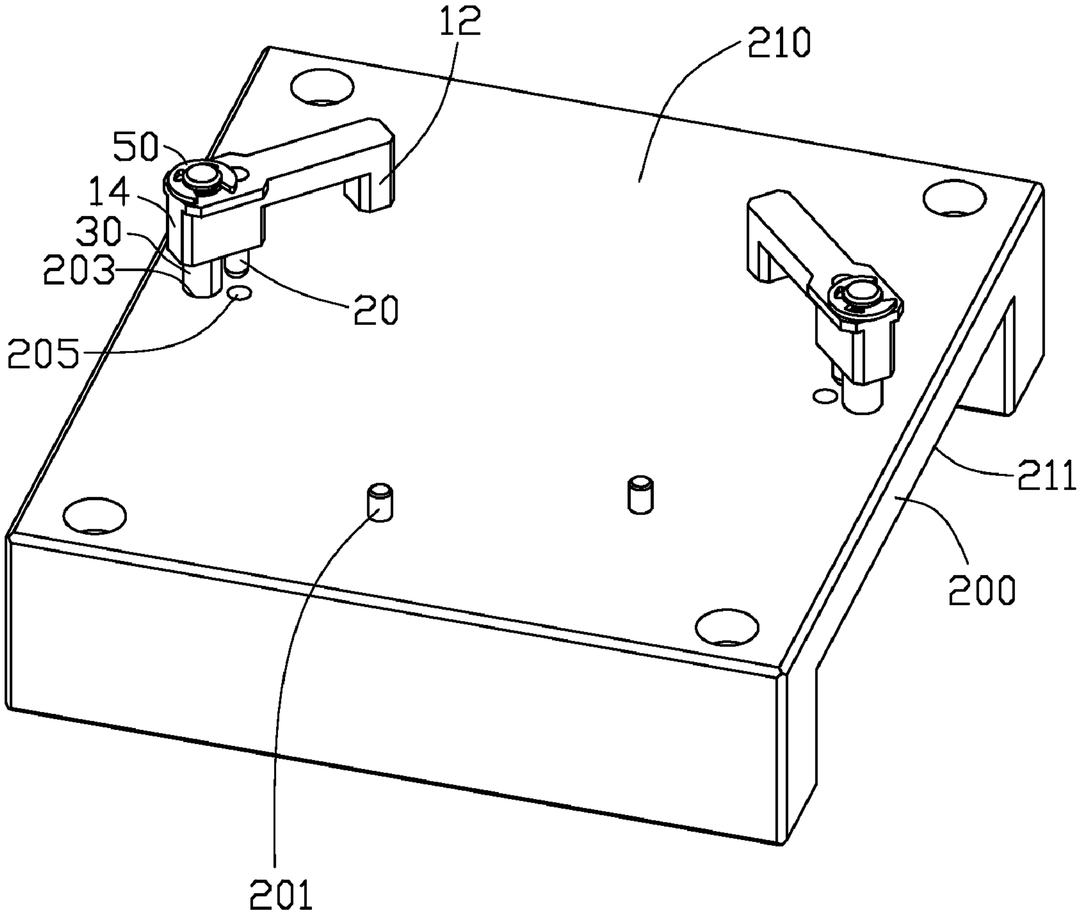
FIG. 2 is an assembled, isometric view of the clamp apparatus of FIG. 1 mounted to a worktable.
Figure 3:
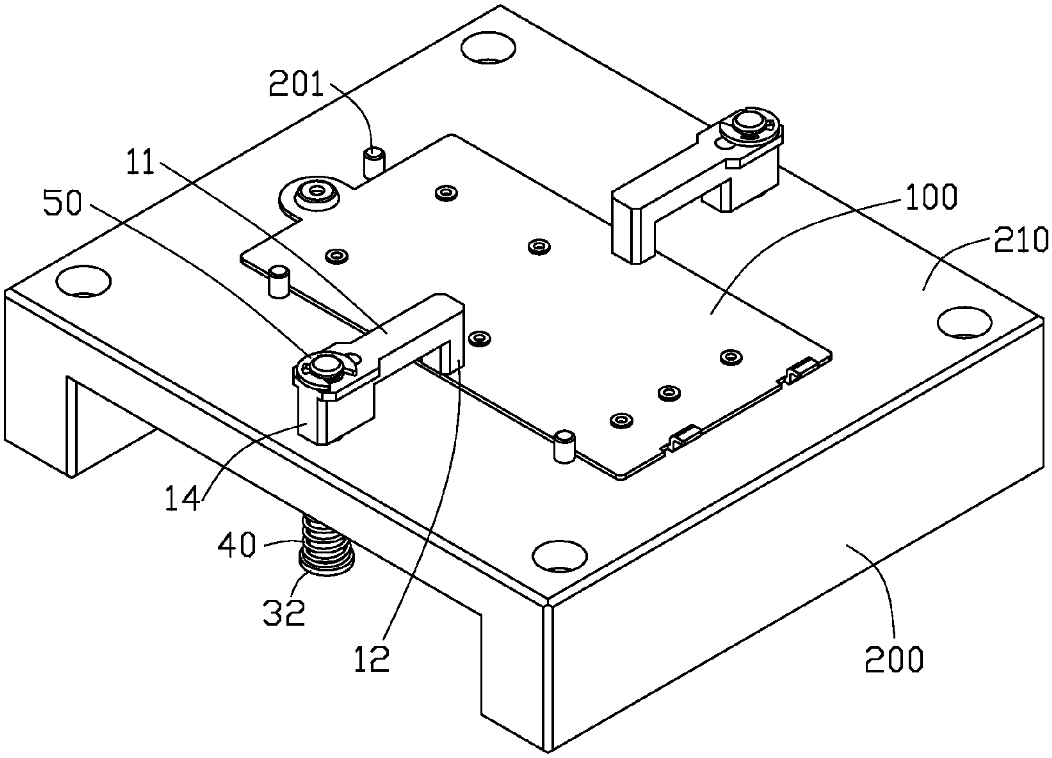
FIG. 3 shows the clamp apparatus of FIG. 2 holding an object on the worktable.

Referring to FIGS. 1-3, in an embodiment, a clamp apparatus 1 is provided to hold an object 100 to a worktable 200. The clamp apparatus 1 includes a pressing member 10, a supporting pin 20, a guiding pole 30, a resilient member 40, and a ferrule 50.

The worktable 200 includes a supporting board 210 and a plurality of positioning pins 201 extending up from the supporting surface 210. The supporting board 210 defines two pivoting holes 203 in opposite sides of the supporting board 210, and two guiding holes 205 adjacent to the pivoting holes 203, respectively.

The pressing member 10 is substantially n-shaped, and includes a connecting portion 11, a pressing portion 12 perpendicularly extending down from a first end of the connecting portion, and a mounting portion 14 located at a second end opposite to the first end of the connecting portion 11. The mounting portion 14 defines a through hole 142 and a fixing hole 143 from top to bottom of the mounting portion 14.

The guiding pole 30 includes a pole body 31 and a disc-shaped blocking portion 32 formed on a first end of the pole body 31. The blocking portion 32 has a diameter greater than the pole body 31. The pole body 31 defines an annular groove 34 adjacent to a second end of the pole body 31, opposite to the first end of the pole body 31.

In one embodiment, the resilient member 40 is a coil spring, capable of being placed around the pole body 31 of the guiding pole 30.

In one embodiment, there are two clamp apparatus 1 mounted to the worktable 200. In other embodiments, there may be only one or more than two clamp apparatus 1 mounted to the worktable 200. Assembling and using ways of one of the clamp apparatus 1 is described below.

In assembly, a first end of the supporting pin 20 is retained in the fixing hole 143 of the pressing member 10 from a bottom of the mounting portion 14. The resilient member 40 is placed around the pole body 31 of the guiding pole 30 from the second end of the pole body 31. The second end of the pole body 31 passes through a corresponding pivoting hole 203 of the worktable 200 from a bottom 211 of the supporting board 210 of the worktable 200, and the through hole 142 of the pressing member 10 from the bottom of the mounting portion 14. Therefore, the pressing member 10 is mounted on the supporting board 210 of the worktable 200. The second end of the pole body 31 of the guiding pole 30 extends out of the pressing member 10. The ferrule 50 is engaged in the groove 34 of the pole body 31 of the guiding pole 30 for preventing the guiding pole 30 from disengaging from the pressing member 10. In other embodiments, the guiding pole 30 may be retained to the pressing member 10 by means such as screws. Opposite ends of the resilient member 40 abut against the blocking portion 32 of the guiding pole 30 and the bottom 211 of the worktable 200, respectively. The pressing member 10 is rotated to make a second end opposite to the first end of the supporting pin 20 be staggered with or extend into a corresponding guiding hole 25 adjacent to the guiding pole 30 of the worktable 200. The pressing portion 12 and the mounting portion 14 abut against the supporting surface 210 of the worktable 200 via a restoring force of the resilient member 40.

In use, the pressing member 10 is driven up from the supporting board 210 of the worktable 200, to disengage the pressing portion 12 from the supporting board 210 of the worktable 200. The pressing member 10 abuts against the ferrule 50, therefore, the ferrule 50 and the guiding pole 30 move with the pressing member 10. The resilient member 40 is deformed when the blocking portion 32 approaches the worktable 200. When the supporting pin 20 totally retreats from the guiding hole 205 of the worktable 200, the pressing member 10 is rotated relative to the worktable 200 to make the supporting pin 20 misalign with the guiding hole 205. The pressing member 10 is released, the pressing member 10 tends to move back towards the worktable 200 via urging from the resilient member 40. The supporting pin 20 abuts against the supporting board 210 of the worktable 200, thereby spacing the pressing portion 12 of the pressing member 10 from the supporting board 210 of the worktable 200. The object 100 to be tested or processed is placed on the supporting board 210 of the worktable 200, with corresponding edges of the object 100 abutting against the plurality of positioning pins 201 of the work table 200. The pressing member 10 is rotated to make the supporting pin 20 align with the guiding hole 205 of the worktable 200, at the same time, the object 100 is fitted between the pressing portion 12 of the pressing member 10 and the supporting board 210 of the worktable 200. The resilient member 40 is restored to urge the blocking portion 32 away from the bottom 211 of the supporting board 210 of the worktable 200. The ferrule 50 moves with the guiding pole 30 and urges the pressing member 10 towards the worktable 200. Therefore, the supporting pin 20 extends into the guiding hole 205 of the worktable 200, and the pressing portion 12 of the pressing member 10 abuts against the object 100, thereby holding the object 100 on the worktable 200 by a restoring force of the resilient member 40.

To remove the object 100 from the work table 200, the pressing member 10 is pulled up away from the supporting board 210 of the worktable 200 to disengage the pressing portion 12 from the object 100. The pressing member 10 abuts against the ferrule 50, therefore, the ferrule 50 and the guiding pole 30 move with the pressing member 10. When the supporting pin 20 retreats from the guiding hole 205 of the worktable 200, the pressing member 10 is rotated relative to the worktable 200 to make the supporting pin 20 misalign with the guiding hole 205. The supporting pin 20 abuts against the supporting board 210 of the worktable 200, to keep the pressing portion 12 spaced from the object 100 and overcoming the restoring force of the resilient member 40. Therefore, the object 100 is ready to be removed from the worktable 200.

The foregoing description of the various inventive embodiments of the disclosure has been presented only for the purposes of illustration and description and is not intended to be exhaustive or to limit the disclosure to the precise forms disclosed. Many modifications and variations are possible in light of the above teaching. The embodiments were chosen and described in order to explain the principles of the disclosure and their practical application so as to enable others of ordinary skill in the art to utilize the disclosure and various embodiments and with various modifications as are suited to the particular use contemplated. Alternately embodiments will become apparent to those of ordinary skill in the art to which the present disclosure pertains without departing from its spirit and scope. Accordingly, the scope of the present disclosure is defined by the appended claims rather than the foregoing description and the various inventive embodiments described therein.

What is claimed is:

1. A clamp apparatus to hold an object on a worktable, the clamp apparatus comprising;

a guiding pole comprising a pole body movably mounted to the worktable, and a blocking portion fixed to the pole body;

a pressing member connected to the pole body of the guiding pole;

a supporting pin extending from the pressing member towards the worktable, wherein the supporting pin is passed through the worktable with the pressing member abutting against the worktable in response to the pressing member at a first position, while the supporting pin abuts against the worktable to prop up the pressing member from the worktable in response to the pressing member at a second position; and a resilient member connected between the blocking portion and the worktable;

wherein the pressing member is rotatable related to the worktable between the first position where the pressing member forces the object against the worktable and the supporting pin passes through the worktable in response to restoring of the resilient member, and the second position where the supporting pin abuts against the worktable to keep a disengagement of the pressing member from the object overcoming restoring of the resilient member.

2. The clamp apparatus of claim 1, wherein the worktable defines a guiding hole structured and arranged to receive the supporting pin when the pressing member is rotated to the first position.

3. The clamp apparatus of claim 1, wherein the blocking portion of the guiding pole is disc-shaped, and formed on a first end of the pole body of the guiding pole, the blocking portion has a diameter greater than a diameter of the pole body.

4. The clamp apparatus of claim 3, wherein the resilient member is a coil spring placed around the pole body of the guiding pole, opposite ends of the resilient member abuts against the blocking portion of the guiding pole, and a bottom opposite to the pressing member of the worktable, respectively.

5. The clamp apparatus of claim 3, further comprising a ferrule, wherein the pressing member defines a through hole to movably receive the pole body of the guiding pole, the ferrule is fixed to the pole body adjacent to a second end opposite to the first end of the pole body, to prevent the pole body from disengaging from the through hole of the pressing member.

6. The clamp apparatus of claim 5, wherein the pole body defines an annular groove adjacent to the second end of the pole body, the ferrule is structured and arranged to be retained in the groove of the pole body.

7. The clamp apparatus of claim 1, wherein the pressing member is substantially n-shaped, and includes a connecting portion, and a pressing portion and a mounting portion respectively extending from opposite ends of the connecting portion of the pressing member, the pressing portion is structured and arranged to abut against the object, the mounting portion is connected to the pole body.

8. A fixing assembly for an object, comprising:

a worktable comprising a supporting board to support the object; and at least one clamp apparatus mounted to the supporting board of the worktable, and each of said at least one clamp apparatus comprising:

a pressing member movable related to the worktable between a first position to cooperate with the supporting board of the worktable to sandwich the object therebetween, and a second position to disengage from the object;

a resilient member biasing the pressing member towards the worktable; and a supporting pin extending from the pressing member, wherein the supporting pin passes through the worktable with the pressing member abutting against the supporting board in response to the pressing member at the first position, wherein the supporting pin abuts against the worktable to space the pressing member from the object overcoming restoring of the resilient member.

9. The fixing assembly of claim 8, further comprising a guiding pole movably passing through the worktable and connected to the pressing member.

10. The fixing assembly of claim 9, wherein the guiding pole comprises a pole body and a blocking portion fixed to the guiding pole, the resilient member is a coil spring placed around the pole body, opposite ends of the resilient member abut against the supporting board of the worktable and the blocking portion of the guiding pole.

11. The fixing assembly of claim 10, wherein the blocking portion faces a bottom opposite to the pressing member of the supporting board.

12. The fixing assembly of claim 8, wherein the worktable defines a guiding hole to receive the supporting pin in response to the pressing member moving to the first position.

13. The fixing assembly of claim 8, wherein said at least one clamp apparatus comprises two clamp apparatuses.

* * * * *